(12) United States Patent
Dorum

(10) Patent No.: US 8,204,680 B1
(45) Date of Patent: Jun. 19, 2012

(54) METHOD OF OPERATING A NAVIGATION SYSTEM TO PROVIDE ROAD CURVATURE

(75) Inventor: Ole Henry Dorum, Chicago, IL (US)

(73) Assignee: NAVTEQ B.V., Veldhoven (NL)

( * ) Notice: Subject to any disclaimer, the term of this patent is extended or adjusted under 35 U.S.C. 154(b) by 1106 days.

(21) Appl. No.: 11/825,208

(22) Filed: Jul. 5, 2007

(51) Int. Cl.
*G01C 21/00* (2006.01)
*G01C 21/34* (2006.01)
*G08G 1/123* (2006.01)

(52) U.S. Cl. ........ 701/411; 701/409; 701/448; 701/450; 701/454; 345/441; 345/442; 340/995.1; 340/995.14; 340/995.19; 340/995.27

(58) Field of Classification Search .......... 701/25, 701/26, 200–226; 703/2; 345/441–443; 340/995.1, 995.22, 995.24, 995.25
See application file for complete search history.

(56) References Cited

U.S. PATENT DOCUMENTS

| | | | |
|---|---|---|---|
| 5,438,517 A | 8/1995 | Sennott et al. | 364/449 |
| 5,566,288 A | 10/1996 | Koerhsen | 395/142 |
| 6,029,173 A | 2/2000 | Meek et al. | 707/102 |
| 6,138,084 A | 10/2000 | Mine | 702/157 |
| 6,188,316 B1 * | 2/2001 | Matsuno et al. | 340/441 |
| 6,392,535 B1 * | 5/2002 | Matsuno et al. | 340/441 |
| 6,405,128 B1 | 6/2002 | Bechtolsheim et al. | 701/208 |
| 6,732,046 B1 * | 5/2004 | Joshi | 701/208 |
| 6,735,515 B2 | 5/2004 | Bechtolsheim et al. | 701/208 |
| 6,862,523 B2 | 3/2005 | Joshi | 701/208 |
| 7,084,882 B1 | 8/2006 | Dorum et al. | 345/589 |
| 7,152,022 B1 * | 12/2006 | Joshi | 703/2 |
| 2005/0149251 A1 * | 7/2005 | Donath et al. | 701/200 |
| 2005/0251332 A1 * | 11/2005 | Entenmann et al. | 701/208 |
| 2006/0224311 A1 * | 10/2006 | Watanabe et al. | 701/208 |

* cited by examiner

*Primary Examiner* — Hussein Elchanti
*Assistant Examiner* — Rami Khatib
(74) *Attorney, Agent, or Firm* — Jon D. Shutter; Frank J. Kozak; Adil M. Musabji

(57) ABSTRACT

A computer implemented method of operating a navigation system to provide road curvature is provided. The method comprises obtaining a plurality of spline control points representing a two-dimensional geometry of a portion a road segment and obtaining data indicating a road grade of the portion of the road segment. The spline control points and data indicating road grade are obtained from a geographic database associated with the navigation system. The method further comprises projecting the spline control points onto a slope provided by the road grade to obtain a representation of a restored true road curvature of the portion of the road segment.

7 Claims, 7 Drawing Sheets

HORIZONTAL CIRCULAR ROAD GEOMETRY

CIRCULAR ROAD GEOMETRY ON A SLOPE

Before Projection

After Projection

Resulting Projected Curve

METHOD OF OPERATING A NAVIGATION SYSTEM TO PROVIDE ROAD CURVATURE

BACKGROUND OF THE INVENTION

The present invention relates to a method and system for operating a navigation system, and more particularly to a method and system for operating a navigation system to provide road curvature.

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Advanced driver assistance systems ("ADAS") have been developed to improve the comfort, efficiency, and overall satisfaction of driving. Examples of advanced driver assistance systems include adaptive headlight aiming, adaptive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar and vision-oriented sensors, such as cameras. Some advanced driver assistance systems also use geographic data. Geographic data from a geographic database can be used in advanced driver assistance systems to provide information about the road network, road geometry, road conditions and other items associated with the road around the vehicle. Further, geographic data can be used to determine the road ahead of the vehicle even around corners or beyond obstructions. Accordingly, geographic data can be a useful addition for some advanced driver assistance systems.

Although navigation systems and advanced driver assistance systems provide many important features, there continues to be room for new features and improvements. Some navigation system features and advanced driver assistance system features use representations of road geometry provided by the geographic data from the geographic database. The performance of these navigation system features and advanced driver assistance system features depend upon accurate representation of road geometry. Thus, there is a need to accurately and efficiently determine and provide road geometry.

SUMMARY OF THE INVENTION

To address these and other objectives, the present invention comprises a method for operating a navigation system to provide road curvature. The method comprises obtaining a plurality of spline control points representing a two-dimensional geometry of a portion a road segment and obtaining data indicating a road grade of the portion of the road segment. The spline control points and data indicating road grade are obtained from a geographic database associated with the navigation system. The method further comprises projecting the spline control points onto a slope provided by the road grade to obtain a representation of a restored true road curvature of the portion of the road segment. The method further comprises providing the representation of road curvature to an ADAS safety system.

According to another aspect, the present invention comprises a method for providing road geometry. The method comprises obtaining data representing a two dimensional shape of a road segment and data representing altitude of the road segment. A slope plane of the road segment is determined using the data representing altitude. The method further comprises projecting the data representing two-dimensional geometry onto the slope plane to obtain a representation of the curvature of the road segment.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
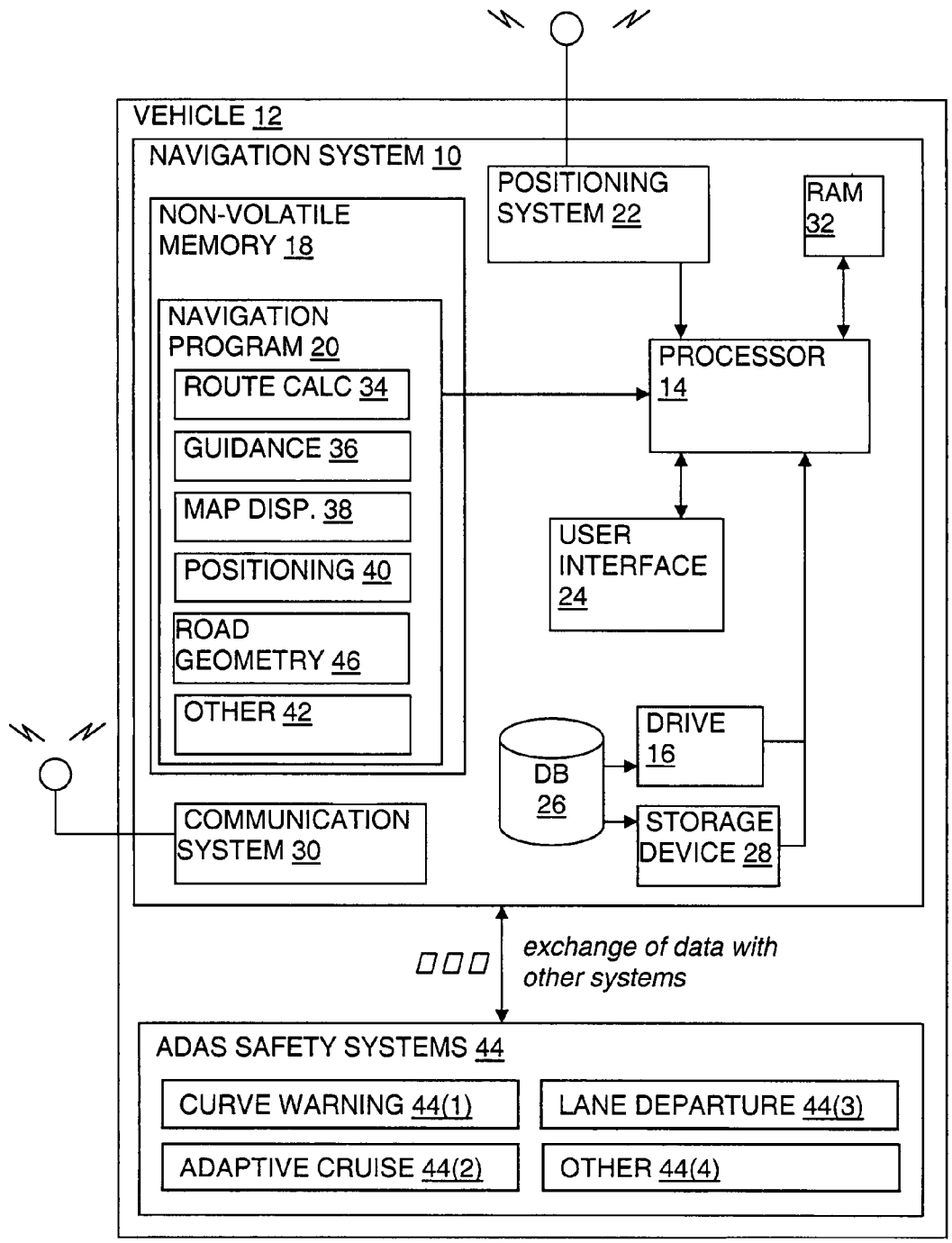
FIG. 1 is a block diagram of a navigation system, according to an exemplary embodiment.

FIG. 1 is a block diagram of a navigation system 10 associated with a vehicle 12. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the vehicle 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26. In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion of the geographic database 26 is stored. In another embodiment, the geographic database 26 is stored on a hard disk. In one embodiment, the geographic database 26 may be a geographic database published by NAVTEQ Corporation of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 32 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching).

Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

The vehicle 12 in FIG. 1 also includes ADAS safety systems 44. Included among the safety systems 44 are a curve warning system 44(1), an adaptive cruise control system 44(2), and a lane departure warning system 44(3). Each of these systems is briefly described.

The curve warning system 44(1) receives data indicating the vehicle position from the navigation system 10. The curve warning system 44(1) also receives data indicating the vehicle speed, road conditions, weather conditions, and ambient light conditions from sensors associated with the vehicle 12. The curve warning system 44(1) also obtains data about the road curvature along the road ahead of the vehicle from the navigation system 10 or directly from the geographic database 26. Using these inputs, the curve warning system 44(1) detects upcoming curves along the vehicle path and provides warnings to the vehicle driver if the vehicle speed is excessive for the upcoming curve given the road conditions.

The adaptive cruise control system 44(2) receives data indicating the vehicle position and speed from the navigation system 10 and the sensor associated with the vehicle 12. The adaptive cruise control system 44(2) also obtains data about the road ahead of the vehicle from the navigation system 10 or directly from the geographic database 26. The data obtained about the road ahead of the vehicle includes information about road curvature, legal vehicular speeds, intersections, hills, etc. Based on these inputs, the adaptive cruise control system 44(2) maintains and/or resumes a set speed or safe following distance from other vehicles at slower than the set speed based on data about the vehicle speed, nearby vehicles and other obstructions, type of road traveled (motorway vs. local road), road curvature, tilt, elevation, and other factors.

The lane departure warning system 44(3) receives data indicating the vehicle position from the navigation system 10 and data indicating the speed and heading from the sensors associated with the vehicle 12. The lane departure warning system 44(3) also obtains data about lane width, number of lanes, etc., from the geographic database 26 via the navigation system 10 or directly from the geographic database 26. Based on these inputs, the lane departure warning system 44(3) detects when the vehicle has departed from a lane and provides warnings to the driver as appropriate. In addition to the safety systems shown in FIG. 1, the vehicle 12 may include other safety systems 44(4), such as adaptive shift control and headlight aiming systems.

The ADAS safety systems 44 may implement methods for using geographic data to provide the safety system features as described in U.S. Pat. Nos. 6,405,128 and 6,735,515, the entire disclosures of which are incorporated by reference herein. These patents describe formation of an electronic horizon for a vehicle. The electronic horizon contains a versatile, structured data representation of the road network around a vehicle that extends from the current position of the vehicle along accessible roads out to a threshold (i.e., the electronic horizon). The electronic horizon is recalculated as the vehicle moves. These patents also describe how an electronic horizon can be used, e.g., in conjunction with sensors in the vehicle, to provide curve warnings, intersection warnings, adjust transmission settings, and so on.

Included among the features described in these patents are the determination of a route-based path and the determination of a most-likely path. An electronic horizon may include multiple paths leading from a vehicle's current position. In the situation in which a vehicle driver is being provided guidance to follow a calculated route to a destination, part of the calculated route will coincide with one of the paths in the electronic horizon. This path may be identified as the route-based-path and data indicating the route-based-path may be stored with the electronic horizon data structure. Even if a vehicle is not following a calculated route to a destination, one of the paths from the vehicle's current position may be determined as the most-likely-path, and other feasible paths may be assigned lower probabilities of occurrence. The most-likely-path and lower probability paths are determined based on identifying the most likely maneuvers a driver may be expected to choose at each upcoming intersection within the electronic horizon. Determining the most likely maneuver that a vehicle driver may choose to take at an intersection is based on a predetermined ranking of all possible maneuvers at the intersection, taking into account turn angles, road function classes, traffic signals, speed limits, and other stored information about the road network.

II. Geographic Database

Figure 2:
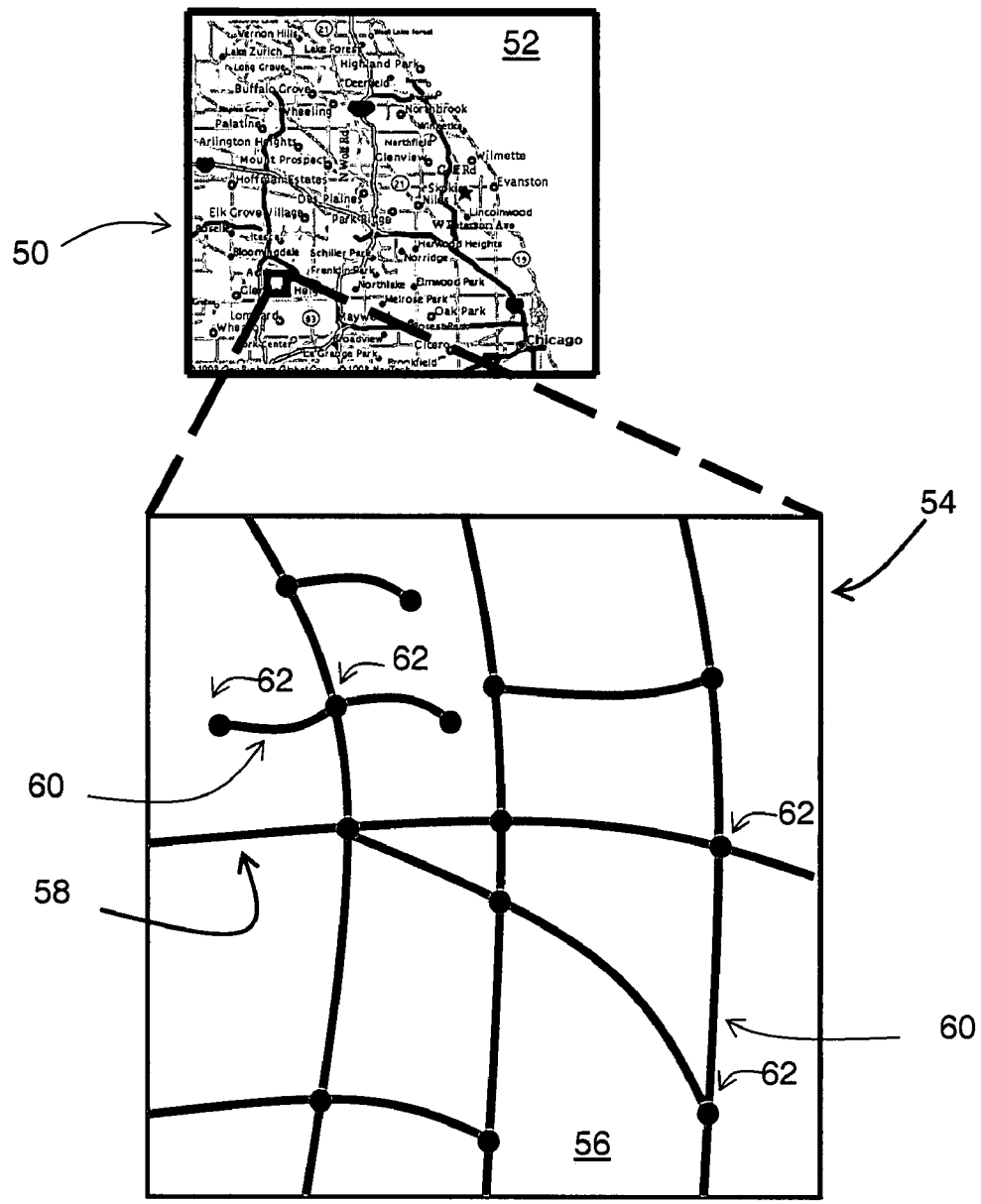
FIG. 2 shows a map of a geographic region.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
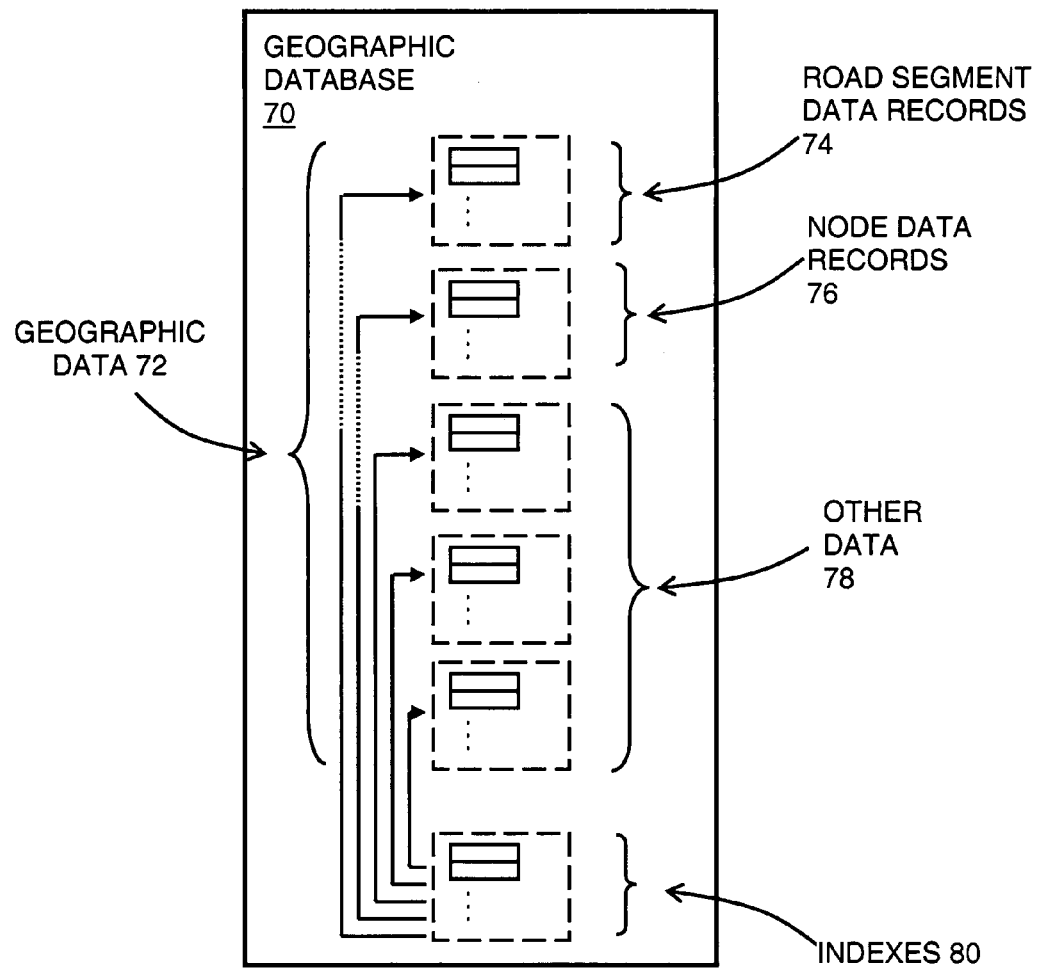
FIG. 3 is a block diagram of a geographic database that represents the geographic region of FIG. 2.

Referring to FIG. 3, a geographic database 70 contains data 72 that represents some of the physical geographic features in the geographic region (52 in FIG. 2). The data 72 contained in the geographic database 70 includes data that represent the road network 58. In the embodiment of FIG. 3, the geographic database 70 that represents the geographic region 52 contains at least one database record 74 (also referred to as "entity" or "entry") for each road segment 60 in the geographic region 52 in FIG. 2. The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 70 also includes indexes 80. The indexes 80 may include various types of indexes that relate the different types of data to each other or that relate to other aspects of the data contained in the geographic database 70.

Figure 4:
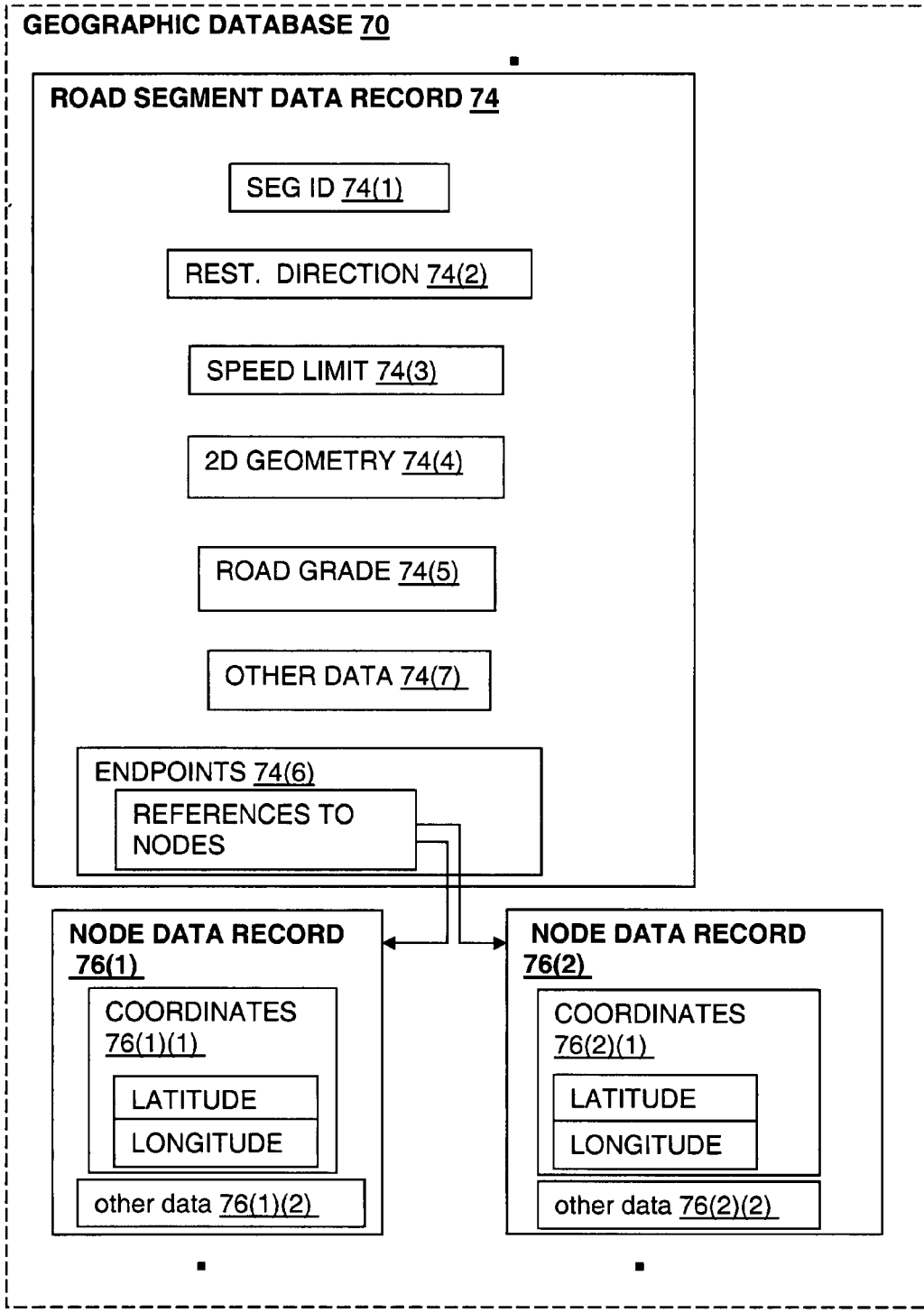
FIG. 4 is a block diagram of components of data records contained in the geographic database depicted in FIG. 3, according to an exemplary embodiment.

FIG. 4 shows some of the components of a road segment data record 74 contained in the geographic database 70. The road segment data record 74 includes a segment ID 74(1) by which the data record can be identified in the geographic database 70. Each road segment data record 74 has associated with it information (such as "attributes", "fields", etc.) that describes features of the represented road segment. The road segment data record 74 may include data 74(2) that indicate the restrictions, if any, on the direction of vehicular travel permitted on the represented road segment. The road segment data record 74 includes data 74(3) that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non sign posted implicit general speed limit based on legislation.

The road segment data record 74 may also include data 74(4) indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

A polynomial spline refers to any composite curve formed with piecewise polynomial functions representing curve sections and satisfying specified conditions at boundaries of the sections. Thus, there are many types of spline curves. For example, the polynomial spline can be any type of spline, for example, a uniform or nonuniform nonrational B-spline, Non-Uniform Rational B-Spline (NURBS), or a uniform or nonuniform Catmull-Rom spline.

With spline curves, other-than-straight road segments, such as curving road portions, are represented by polynomial equations whose coefficients have been determined so as to generate curves that match the shape of the road segment with the desired degree of accuracy. Thus, splines are a means of describing the shape of a series of points by specifying the coefficients of a polynomial equation. A polynomial spline consists of piecewise polynomial functions which are joined end to end with some continuity condition imposed at the join points. The polynomial spline is determined by a set of control points $C_0, C_1, \ldots C_N$, and possibly, additional parameters (e.g., knots, control point weights and/or polynomial coefficients). A control point is a physical point that lies on or close to an actual point along the represented geographic feature. A set of control points mathematically describes the spline. Thus, the control points dictate the shape of a spline. Similar to a shape point, the control point is a coordinate pair (longitude, latitude), which represent specific locations along the road segment.

A road segment that has a straight section and an other-than-straight section can be represented by shape points and polynomial spline control points. For example, for a road segment that has long straight sections, the straight sections can be represented using conventional linear interpolation and curved sections can be represented by splines. The shape point coordinates of the endpoints of the straight section, the control points corresponding to the curved sections and other defining parameters (knots, control point weights and/or polynomial coefficients) can be stored in a single data entity 74(4) indicating the 2D geometry or shape of the road segment.

The road segment data record 74 also includes road grade data 74(5) that indicate the grade or slope of the road segment. In one embodiment, the road grade data 74(5) include road grade change points and a corresponding percentage of grade change. Additionally, the road grade data 74(5) may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 74(5) includes the road grade change points and an actual road grade value for the portion of the road segment after the road grade change point until the next road grade change point or end node. In a further embodiment, the road grade data 74(5) includes elevation data at the road grade change points and nodes. In an alternative embodiment, the road grade data 74(5) is an elevation model which may be used to determine the slope of the road segment.

The road segment data record 74 also includes data 74(6) providing the geographic coordinates (e.g., the latitude and longitude) of the end points of the represented road segment. In one embodiment, the data 74(6) are references to the node data records 76 that represent the nodes corresponding to the end points of the represented road segment.

The road segment data record 74 may also include or be associated with other data 74(7) that refer to various other attributes of the represented road segment. The various attributes associated with a road segment may be included in a single road segment record, or may be included in more than one type of record which cross-reference each other. For example, the road segment data record 74 may include data identifying the name or names by which the represented road segment is known, the street address ranges along the represented road segment, and so on.

FIG. 4 also shows some of the components of a node data record 76 contained in the geographic database 70. Each of the node data records 76 may have associated information (such as "attributes", "fields", etc.) that allows identification of the road segment(s) that connect to it and/or it's geographic position (e.g., its latitude and longitude coordinates). For the embodiment shown in FIG. 3, the node data records 76(1) and 76(2) include the latitude and longitude coordinates 76(1)(1) and 76(2)(1) for their nodes. The node data records 76(1) and 76(2) may also include other data 76(1)(2) and 76(2)(2) that refer to various other attributes of the nodes.

III. Method for Restoring True Road Curvature

The geographic database 70 includes road segment data records 74 that provide data indicating 2D road geometry 74(4). The geographic coordinates of latitude and longitude values for the shape points or spline control points represent the shape of the road projected on a horizontal plane. That is, since the 2D road geometry only provides latitude and longitude values, the 2D road geometry does not use an altitude component. Although the data that indicates 2D geometry is a convenient storage format, the 2D road geometry without considering altitude may not be sufficient for some applications.

Figure 5:
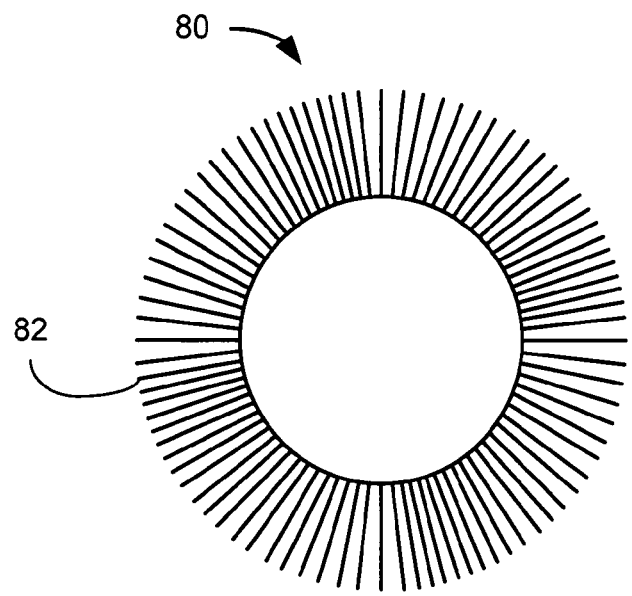
FIG. 5 is a diagram of a circular road segment on a horizontal plane and a circular road segment on a sloped plane.
Figure 5:
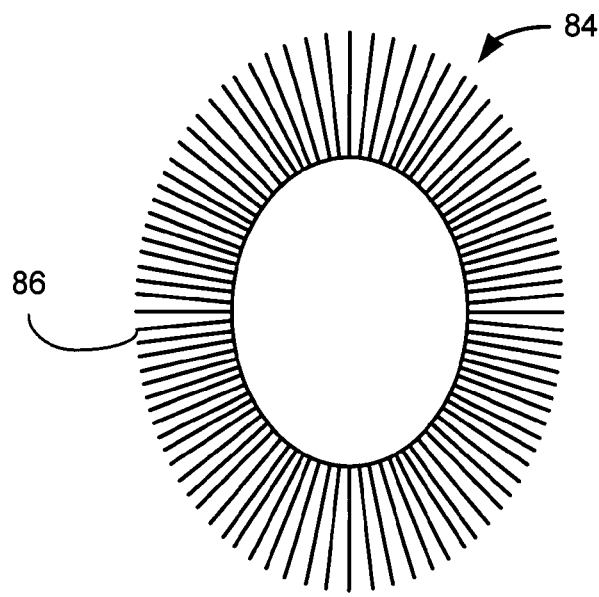

FIG. 5 illustrates a circular road segment 80 on a horizontal plane with zero slope generated using only the latitude and longitude values of shape points or spline control points. The curvature vectors 82 (arbitrarily scaled) show that the curvature for the circular road segment 80 is the same in all directions as is expected of a circular shape. In this example, because the road segment 80 is located on a horizontal plane with zero slope, the true road curvature of a circle is properly represented by the 2D latitude and longitude values of shape points or spline control points.

FIG. 5 also illustrates an identical circular road segment on a thirty degree slope generated using only the latitude and longitude values of shape points or spline control points. The shape of the circular road geometry on the thirty degree slope formed using only the 2D geometry is an ellipse 84. The curvature vectors 86 show that the curvature for the circular road segment 84 on the slope, formed using the 2D geometry data of latitude and longitude, is distorted. The curvature at the top and bottom of the ellipse 84 is greater than that of the circle 80, and the curvature at the right and left sides of the ellipse 84 is less than that of the circle 80, wherein the curvature vectors should be the same in all directions. Thus, the 2D geometry data does not represent the true road geometry or curvature of the circle because the altitude component or slope of the road segment is not considered. Accordingly, the 2D road geometry without considering altitude may not be sufficient for some applications that require a precise representation of road curvature.

Figure 6:
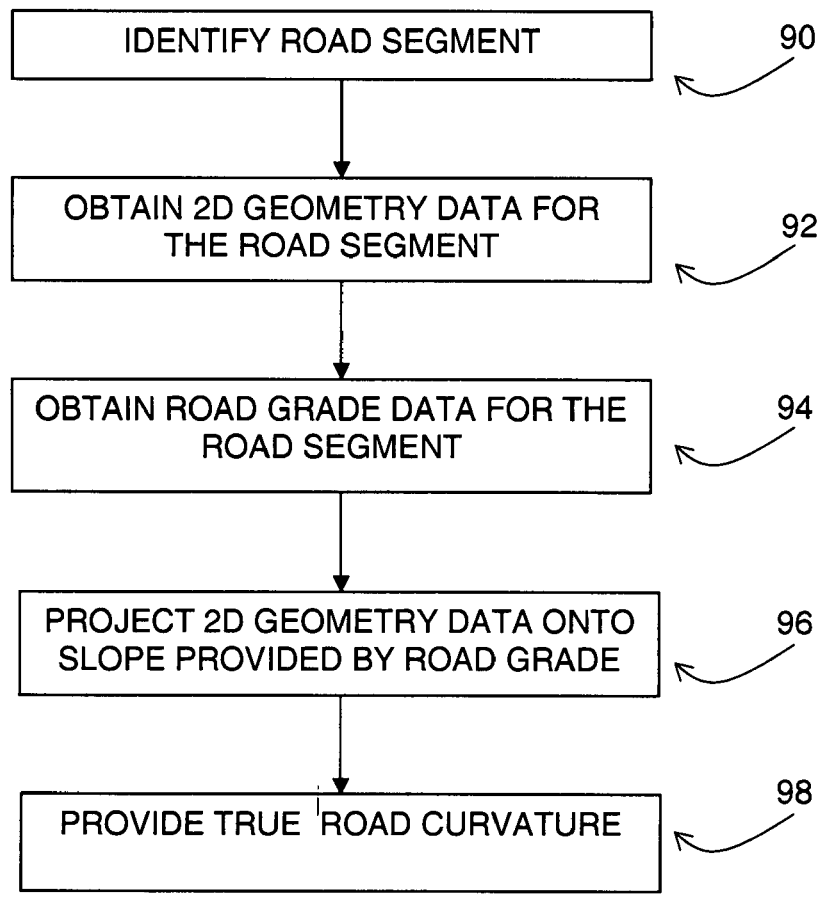
FIG. 6 is a flow chart for a method for restoring true road curvature according to one embodiment of the present invention.

FIG. 6 is a flow chart representing the steps of a method for restoring true road curvature. In one embodiment, the navigation system 10 implements a road geometry application software program 46 to perform the method for restoring true road curvature. At step 90, the method identifies the road segment for which to restore true road curvature. Typically, the identified road segment is a road segment that the vehicle 12 is currently traveling on or a road segment that the vehicle is approaching. To identify the road segment, the navigation system 10 implements the positioning navigation application software program 40. Using data from the positioning system 22, the positioning application 40 performs map matching to identify the road segment on which the vehicle is currently traveling. At step 92, the method obtains data 74(4) indicating the 2D geometry for the road segment identified in step 90 from the geographic database. In one embodiment, the data 74(4) indicating the 2D geometry comprises spline control points. At step 94, the method obtains road grade data 74(5) for the road segment from the geographic database.

Figure 7:
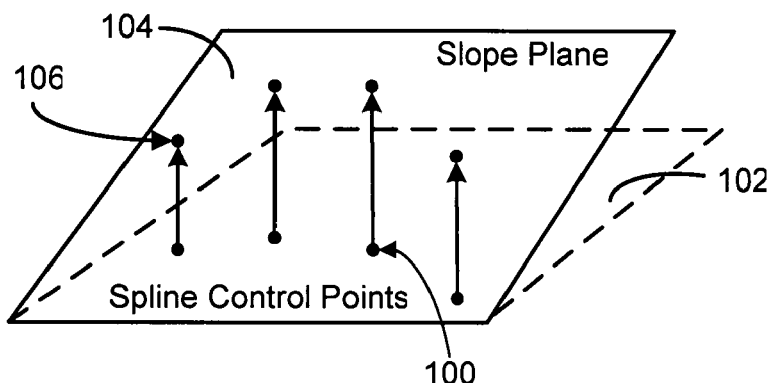
FIG. 7 is a diagram of spline control points being projected onto a slope plane.

At step 96, the 2D geometry data is projected onto a slope provided by the road grade data 74(5). FIG. 7 illustrates an example of the projection step. In one embodiment, the spline control points 100 comprising the coordinate pairs of latitude and longitude may be viewed as residing on a horizontal plane 102. The road grade data provides a slope (incline or decline) that defines a slope plane 104. The affine properties of B-splines allow the spline to be projected onto the slope. As shown in FIG. 7, the spline control points 100 are projected onto the slope plane 104 to provide projected spline control points 106. The projected spline control points 106 located on the slope plane 104 provide a representation of true road curvature for the road segment. The projection of the 2D geometry onto the slope plane restores the altitude components to the shape.

At step 98, the true road curvature provided by the projected spline control points 106 located on the slope plane is provided to a navigation system application or an ADAS safety system. In one embodiment, the slope plane 104 with projected spline control points 106 may be rotated to horizontal to provide the restored road curvature as two-dimensional spline control points. In another embodiment, the projected spline control points may be provided as coordinate triples with z-plane components provided from the slope plane 104. In one embodiment the data 74(4) indicating the 2D geometry includes a knot vector. For this embodiment, the knot vector does not change when the control points are projected onto the slope. Therefore, in this case, the projected spline control points 106 and original knot vector are provided to the navigation system application or ADAS safety system.

Figure 8:
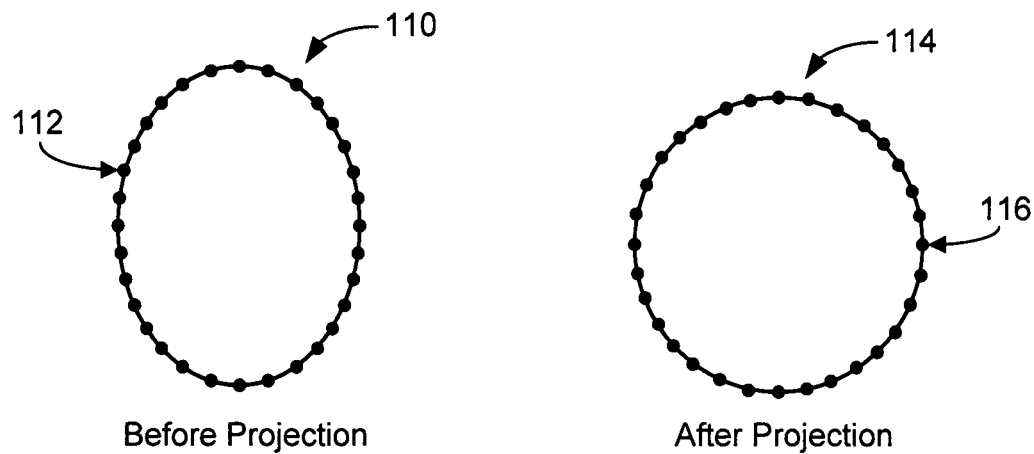
FIG. 8 is a diagram of spline control points representing a circular road before and after implementing the method for restoring true road curvature.
Figure 8:
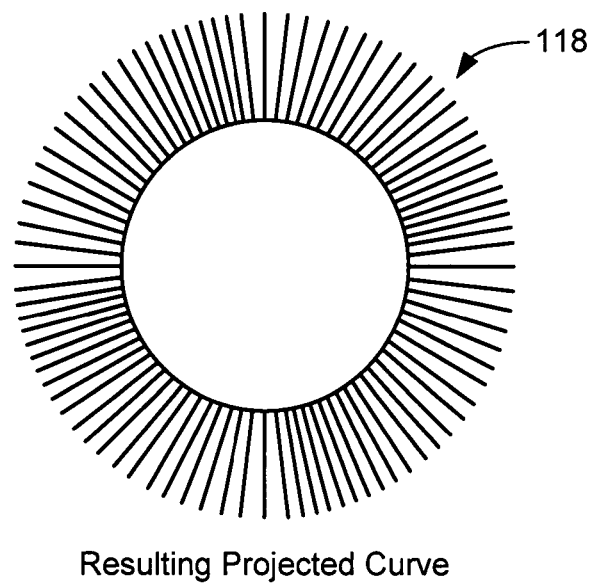

FIG. 8 illustrates an example of restoring true road curvature for a road segment. A road segment 110 is represented by its 2D geometry, such as the spline control points 112 represented as coordinate pairs of latitude and longitude. As shown, the shape of the road segment 110 is elliptical when using only the 2D geometry. The same road segment has its true curvature restored using the method described in conjunction with FIG. 6. The restored curvature road segment 112 is represented by its projected control points 116. As shown, the shape of the restored curvature road segment 114 is circular. FIG. 8 also illustrates the curvature 118 of the restored curvature road segment 112. As shown in FIG. 8, the true circular road shape has been fully restored as can be seen by the curvature vectors which are now equally long everywhere on the circle.

The method for restoring true road curvature described in conjunction with FIG. 6 has several alternative embodiments. In another embodiment, another system, such as one of the ADAS safety systems 44, associated with the vehicle 12, may perform the method for restoring true road curvature. Additionally, although the method for restoring true road curvature was described with spline control points as the data 74(4) indicating the 2D geometry for the road segment from the geographic database, other data indicating 2D geometry may also be used such as shape point coordinate pairs (latitude and longitude) and data representing mathematical expressions. In one embodiment, other representations of the 2D geometry may be first converted into B-splines prior to the step of projecting the B-spline control points onto the slope plane.

Moreover, in additional to using the road grade data 74(5) to determine the slope plane 104, the slope plane may be determined using any type of data that represents altitude. For example, the slope plane may be generated from elevation models, topological models and altitude data associated with end points or points along the road segment. In addition, the vehicle 12 may obtain data to generate the slope plane from alternative sources than the geographic database 26. For example, the navigation system may determine the grade of the road segment on which it is currently traveling using altitude component from the positioning system 22 of at least two positions of the vehicle on the road segment. Additionally, the navigation system may obtain a coordinate triple (longitude, latitude and altitude) of a position of another vehicle traveling on the road segment through vehicle to vehicle communications. The grade of the road segment may be calculated using the altitude component of the current vehicle's position and the altitude component of the other vehicle traveling the road segment. Furthermore, other methods for determining road grade or slope of the road may also possible.

In some cases, the road segment does not have uniform road grade or slope along its entire length. For example, the road grade data 74(5) may include road grade change points indicating the positions at which the road grade changes along the road segment. For road segments that do not have uniform road grade, the road grade data provides at least two separate slope planes. For example, if the road grade data 74(5) provides two road grade change points, three slopes would be provided with a first slope from one endpoint to the first road grade change point, a second slope from the first road grade change point to the second road grade change point, and a third slope from the second road grade change point to the second endpoint. The method for restoring true road curvature would then use three slope planes and the spline control points would be projected onto their respective slope plane corresponding to their position along the road segment.

Furthermore, the navigation system 10 or other system may not have to implement the method for restoring true road curvature for all road segments. In one embodiment, the system determines whether the road segment is straight, if so, the system does not perform the method for restoring true road curvature. In another embodiment, the system may determine whether the degree of curvature is less than a predetermined minimum amount, if so, the system does not perform the method for restoring true road curvature. When the road segment is straight or nearly straight, the system does not need to perform the method for restoring true road curvature. In another embodiment, the system determines whether the road segment is flat or zero road grade, if so; the system does not perform the method for restoring true road curvature. In another embodiment, the system may determine whether the degree of road grade is less than a predetermined minimum amount, if so, the system does not perform the method for restoring true road curvature. When the road segment is flat or nearly flat, the system does not need to perform the method for restoring true road curvature.

IV. Applications for the Method for Restoring True Road Curvature

Some navigation system features and some ADAS safety systems require precise road geometry information such as curvature. As shown in FIG. 5, the data indicating 2D geometry provided in the geographic database does not adequately represent the true road curvature when the road segment is located on an incline, such as curvy roads in hilly terrain. This problem may be solved using the method for restoring true road curvature as described above in conjunction with FIG. 6. Accordingly, some navigation system features and some ADAS safety systems may apply the method for restoring true road curvature.

In one embodiment, the ADAS safety systems 44 implement the method for restoring true road curvature when forming an electronic horizon for a vehicle. The electronic horizon contains a versatile, structured data representation of the road network around a vehicle that extends from the current position of the vehicle along accessible roads out to a threshold (i.e., the electronic horizon). The electronic horizon is recalculated in real time as the vehicle moves. In one embodiment, the system restores the true road curvature for each road segment of the electronic horizon by projecting the 2D geometry onto the slope plane. In another embodiment, the system evaluates the magnitude of the road grade data of each of the road segments of the electronic horizon. For those road segments whose road grade data indicate a slope (incline or decline) exceeding a predetermined amount, the system will implement the method for restoring true road curvature. For those road segments whose road grade data indicate a slope (incline or decline) less than the predetermined amount, the system does not implement the method for restoring true road curvature because the 2D geometry is sufficient.

The curve warning system 44(1) is one of the ADAS safety systems that a precise representation of road curvature improves the system's performance. One of the inputs to the curve warning system 44(1) is data representing the road curvature along the road ahead of the vehicle. The curve warning system may obtain the data representing road curvature from the navigation system 10, directly from the geographic database 26 or from the electronic horizon. Hence, the curve warning system 44(1) may receive data that has already been restored to true road curvature by the navigation system or from the electronic horizon or the curve warning system 44(1) may implement the method for restoring true road curvature with the data indicating 2D geometry and road grade obtained from the geographic database. Similar to the description above, for those road segments whose road grade data indicate a slope (incline or decline) exceeding a predetermined amount, the curve warning system 44(1) implements the method for restoring true road curvature. For those road segments whose road grade data indicate a slope (incline or decline) less than the predetermined amount, the curve warning system 44(1) does not implement the method for restoring true road curvature because the 2D geometry is sufficient. Using the restored true road curvature and other inputs, the curve warning system 44(1) detects upcoming curves along the vehicle path and provides warnings to the vehicle driver if the vehicle speed is excessive for the upcoming curve given the road conditions.

Another ADAS safety system that functions better using a precise representation of road curvature is the adaptive cruise control system 44(2). Similar to the curve warning system 44(1), the adaptive cruise control system 44(2) also obtains data about the road ahead of the vehicle via the navigation system 10, directly from the geographic database 26 or from the electronic horizon. Hence, the adaptive cruise control system 44(2) may receive data that has already been restored to true road curvature by the navigation system or from the electronic horizon or the adaptive cruise control system 44(2) implements the method for restoring true road curvature with the data indicating 2D geometry and road grade obtained from the geographic database. Likewise, the adaptive cruise control system 44(2) may evaluate the degree of the road grade to determine whether implementing the method for restoring true road curvature is necessary. Based on the road curvature and other inputs, the adaptive cruise control system 44(2) maintains and/or resumes a set speed or safe following distance from other vehicles at slower than the set speed based on data about the vehicle speed, nearby vehicles and other obstructions, type of road traveled (motorway vs. local road), road curvature, tilt, elevation, and other factors.

A further ADAS safety system whose performance improves using a precise representation of road curvature is the lane departure warning system 44(3). The lane departure warning system 44(3) may also obtain data about the shape of the road on which the vehicle travels via the navigation system 10, directly from the geographic database 26 or from the electronic horizon. Hence, the lane departure warning system 44(3) may receive data that has already been restored to true road curvature by the navigation system or from the electronic horizon or the lane departure warning system 44(3) may implement the method for restoring true road curvature with the data indicating 2D geometry and road grade obtained from the geographic database. Likewise, the lane departure warning system 44(3) may evaluate the degree of the road grade to determine whether implementing the method for restoring true road curvature is necessary. Based on the various inputs, the lane departure warning system 44(3) detects when the vehicle has departed from a lane and provides warnings to the driver as appropriate.

In addition to the safety systems describe above, the method for restoring road curvature may be used in other ADAS safety system including an adaptive shift control system and a headlight aiming system. The other ADAS safety systems may implement the method for restoring true road curvature in the manner described above, or the systems may obtain data representing the restored true road curvature. Furthermore, the method for restoring road curvature may be used in various features and functions of the navigation system, such as the map display to depict an accurate road shape.

Moreover, in another embodiment, the method for restoring road curvature may be implemented by a geographic database developer to update an existing master copy of a geographic database. For geographic regions with hilly or mountainous areas as well curvy roads, the geographic database developer implements the method on selected road segments and updates the geographic database by storing the corrected spline control points in road segment data records. For example, the corrected spline control points may replace the existing data representing 2D geometry in the road segment data record.

It is intended that the foregoing detailed description be regarded as illustrative rather than limiting and that it is understood that the following claims including all equivalents are intended to define the scope of the invention.

I claim:

1. A computer implemented method of operating a navigation system to provide road curvature comprising:
    obtaining, using a processor, a plurality of spline control points representing a two-dimensional geometry of a portion of a road segment from a geographic database associated with said navigation system, wherein each of the spline control points lies on or close to a point along the represented road segment, wherein each of the spline control points comprises a latitude and longitude coordinate pair;
    obtaining, using the processor, data indicating a road grade of said portion of said road segment from said geographic database; and
    projecting, using the processor, said spline control points onto a slope plane having a slope provided by said road grade to obtain a plurality of projected spline control points, wherein the projected spline control points provide a representation of a restored true road curvature of said portion of said road segment that restores altitude components to the road curvature, wherein each of the projected spline control points comprise a latitude, longitude and altitude coordinate triple.

2. The method of claim 1 further comprising providing said plurality of projected spline control points to an ADAS safety system.

3. The method of claim 2 wherein said ADAS safety system is a curve warning system.

4. The method of claim 1 further comprising evaluating said road grade to determine whether a magnitude of the road grade of said road segment is larger than a predetermined amount, if so performing said projecting step.

5. The method of claim 1 further comprising identifying a road on which a vehicle associated with said navigation system is traveling.

6. A computer implemented method of operating a navigation system to provide road curvature comprising:
- obtaining, using a processor, data indicating a degree of curvature of a portion of a road segment from a geographic database associated with said navigation system;
- if the degree of curvature is greater than a predetermined amount, obtaining, using the processor, data indicating a road grade of said portion of said road segment and projecting, using a processor, a plurality of spline control points representing a two-dimensional geometry of a portion of a road segment onto a slope plane having a slope provided by said road grade to obtain a plurality of projected spline control points, wherein the projected spline control points provide three-dimensional geometry of the portion of the road segment and providing the projected spline control points to an ADAS safety system; and
- if the degree of curvature is less than a predetermined amount, do not project the plurality of spline control points representing the two-dimensional geometry of the portion of the road segment onto the slope plane.

7. A computer implemented method of operating a navigation system to provide road curvature comprising:
- obtaining, using a processor, data indicating a road grade of a portion of a road segment from a geographic database associated with said navigation system;
- if the road grade is greater than a predetermined amount, projecting, using the processor, a plurality of spline control points representing a two-dimensional geometry of a portion of a road segment onto a slope plane having a slope provided by said road grade to obtain a plurality of projected spline control points, wherein the projected spline control points provide three-dimensional geometry of the portion of the road segment and providing the projected spline control points to an ADAS safety system; and
- if the road grade is less than a predetermined amount, do not project the plurality of spline control points representing the two-dimensional geometry of the portion of the road segment onto the slope plane.

\* \* \* \* \*